(12) United States Patent
Olafsson

(10) Patent No.: US 8,724,790 B2
(45) Date of Patent: May 13, 2014

(54) SYSTEMS AND METHODS FOR NETWORK FACSIMILE TRANSMISSIONS

(75) Inventor: Sverrir Olafsson, Newport Beach, CA (US)

(73) Assignee: Conexant Systems, Inc., Irvine, CA (US)

( * ) Notice: Subject to any disclaimer, the term of this patent is extended or adjusted under 35 U.S.C. 154(b) by 1237 days.

(21) Appl. No.: 12/371,406

(22) Filed: Feb. 13, 2009

(65) Prior Publication Data

US 2010/0208723 A1    Aug. 19, 2010

(51) Int. Cl.
| | | |
|---|---|---|
| H04M 7/00 | (2006.01) | |
| H04L 12/66 | (2006.01) | |
| G06F 3/12 | (2006.01) | |
| H04N 1/00 | (2006.01) | |
| H04N 1/32 | (2006.01) | |

(52) U.S. Cl.
USPC ...... 379/220.01; 379/219; 379/229; 379/231; 370/352; 370/353; 370/354; 358/1.15; 358/400; 358/442

(58) Field of Classification Search
USPC ............ 379/100.01, 219, 220.01, 229, 231, 379/352, 353, 354, 355.01, 355.02, 355.03, 379/355.04, 355.05, 355.06, 355.07, 379/355.08, 355.09, 355.1, 356.01; 370/352–356, 351, 357; 358/442
See application file for complete search history.

(56) References Cited

U.S. PATENT DOCUMENTS

| | | | |
|---|---|---|---|
| 6,058,169 A * | 5/2000 | Bramnick et al. ....... | 379/100.01 |
| 6,721,307 B1 | 4/2004 | Kim | |
| 7,215,663 B1 | 5/2007 | Radulovic | |
| 7,346,043 B1 | 3/2008 | Olshansky et al. | |
| 7,359,370 B1 * | 4/2008 | Renkel et al. ................. | 370/352 |
| 7,576,882 B2 | 8/2009 | Mehta et al. | |
| 2001/0040697 A1 | 11/2001 | Wu et al. | |
| 2002/0131089 A1 | 9/2002 | Tanimoto | |
| 2003/0112796 A1 * | 6/2003 | Kwan ........................ | 370/352 |
| 2004/0022237 A1 | 2/2004 | Elliott et al. | |
| 2004/0184110 A1 | 9/2004 | Maei et al. | |
| 2005/0091407 A1 | 4/2005 | Vaziri et al. | |
| 2005/0232164 A1 * | 10/2005 | Anzarouth et al. ........... | 370/255 |

(Continued)

FOREIGN PATENT DOCUMENTS

| | | | |
|---|---|---|---|
| JP | 2002-044357 A | 2/2002 | |
| JP | 2008-131446 A | 6/2008 | |

OTHER PUBLICATIONS

Understanding IP Fax, MESSAGEmanager Solutions, Sep. 2008, pp. 2-8.*

(Continued)

*Primary Examiner* — Khai N Nguyen
(74) *Attorney, Agent, or Firm* — John R. Thompson; Stoel Rives LLP

(57) ABSTRACT

Disclosed herein are systems and methods for sending and receiving facsimile transmissions in a voice-over-IP system. In certain embodiments, a facsimile machine may include a network interface and a call set up protocol client configured to interface with a call set up protocol server. The call set up protocol client may communicate with the call set up protocol server using the network interface to establish a communication channel with the public switched telephone network. The call set up protocol client may operate according to the session initiation protocol. The facsimile machine may be configured to send and receive facsimile transmissions according to the T.30 protocol. In alternative embodiments, the facsimile machine may be configured to send and receive facsimile transmissions according to the T.38 protocol.

24 Claims, 4 Drawing Sheets

(56) References Cited

U.S. PATENT DOCUMENTS

| | | | |
|---|---|---|---|
| 2006/0126605 A1 | 6/2006 | Kajiwara | |
| 2006/0268831 A1* | 11/2006 | Ulybin | 370/352 |
| 2007/0127455 A1 | 6/2007 | Fujioka | |
| 2007/0280219 A1 | 12/2007 | Shimizu et al. | |
| 2008/0018948 A1 | 1/2008 | Li et al. | |
| 2009/0059918 A1 | 3/2009 | Spade et al. | |
| 2009/0073499 A1* | 3/2009 | Glunz | 358/400 |
| 2009/0080411 A1 | 3/2009 | Lyman | |
| 2009/0097478 A1 | 4/2009 | Didcock et al. | |
| 2009/0153908 A1 | 6/2009 | Fahrenthold | |
| 2009/0296690 A1* | 12/2009 | Garcin et al. | 370/352 |
| 2010/0149701 A1 | 6/2010 | Drapkin et al. | |

OTHER PUBLICATIONS

GAO Research, World's Leading Supplier of Embedded Software and Hardware Covering, http://www.gaoresearch.com/products/faxsoftware/other/IAF/index.php, printed Feb. 17, 2009, 2 pgs.

Understanding IP Fax, MESSAGEmanager Solutions, White Paper, Sep. 2008, 10 pgs.

Tackling fax-over-IP, http://www.cedmagazine.com/tackling-fax-over-ip.aspx printed Feb. 17, 2009, 4 pgs.

NIC FAX KIT TYPE 210, Operating Instructions, UE USA H132-8698, © 2000, 114 pgs.

International Search Report for PCT/US2010/024191, International Filing Date Feb. 12, 2010, mailed Oct. 4, 2010, 10 pgs.

Notification Concerning Transmittal of International Preliminary Report on Patentability for PCT/US2010/024191, filed Feb. 12, 2010, 7 pgs.

Choudhary, Ulman, et al., "Using T.38 and SIP for Real-Time Fax Transmission over IP Networks," Tampa, Florida, 26th Annual IEEE International Conference on Local Computer Networks (LCN'01), ISBN: 0-7695-1321-2, printed Mar. 10, 2010, 1 pg.

"Analog VoIP Gateway Routers," Black Box Network Services, © 2008, 5 pgs.

Notice of Allowance and Fee(s) Due mailed Apr. 12, 2013, for U.S. Appl. No. 12/487,528, filed Jun. 18, 2009.

\* cited by examiner

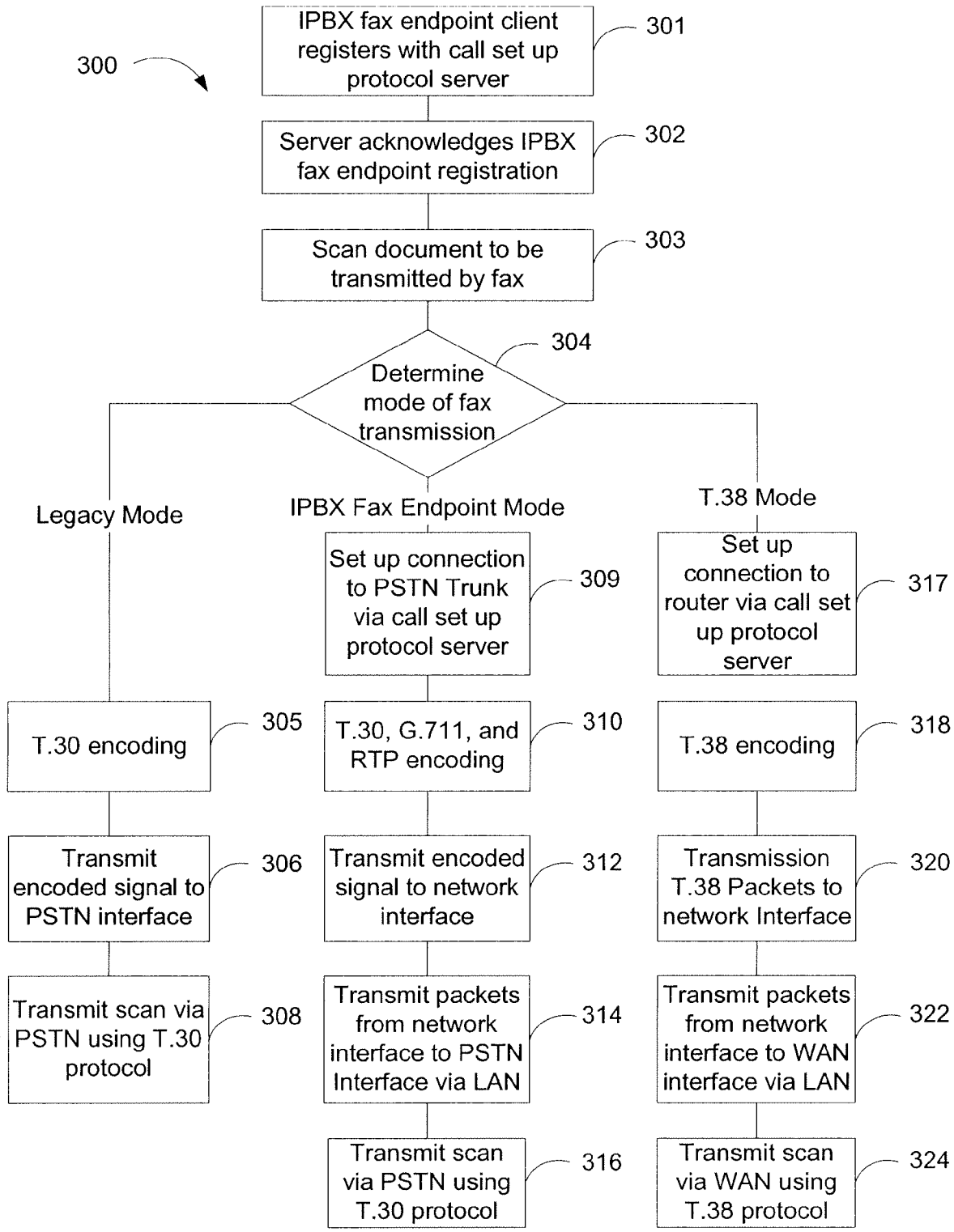

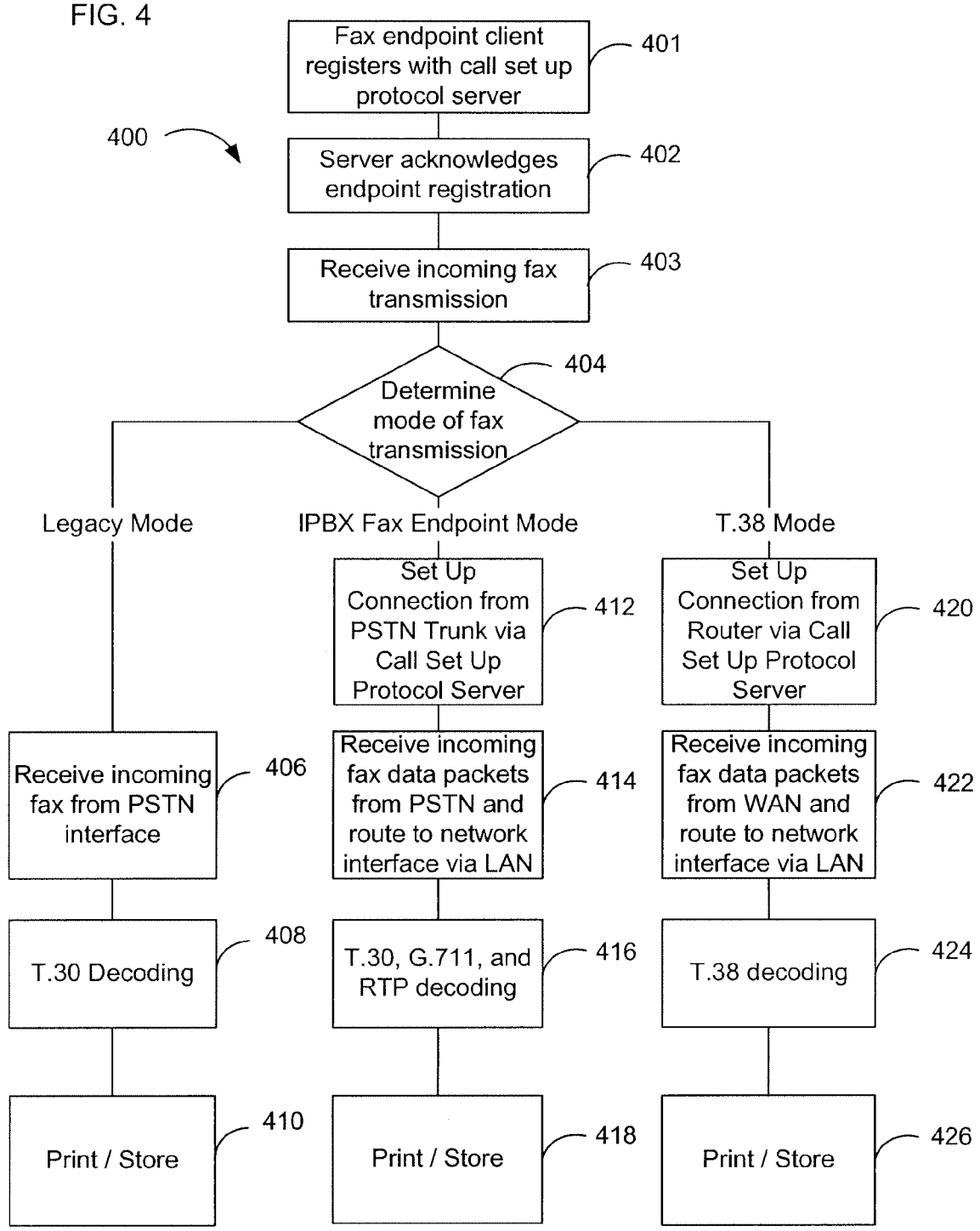

SYSTEMS AND METHODS FOR NETWORK FACSIMILE TRANSMISSIONS

TECHNICAL FIELD

The present disclosure relates to systems and methods for transmitting documents by facsimile in connection with a data network.

BRIEF DESCRIPTION OF THE DRAWINGS

The various aspects and advantages are described by way of example in the following description of several embodiments and attached drawings. It should be understood that the accompanying drawings depict only typical embodiments and, as such, should not be considered to limit the scope of the claims. The embodiments will be described and explained with specificity and detail in reference to the accompanying drawings in which:

FIG. 3 is a flow chart illustrating one embodiment of a method for sending a facsimile transmission in a legacy mode, an IPBX endpoint mode, and a T.38 mode.

FIG. 4 is a flow chart illustrating one embodiment of a method for receiving a facsimile transmission in a legacy mode, an IPBX endpoint mode, and a T.38 mode.

DETAILED DESCRIPTION OF PREFERRED EMBODIMENTS

Figure 1:
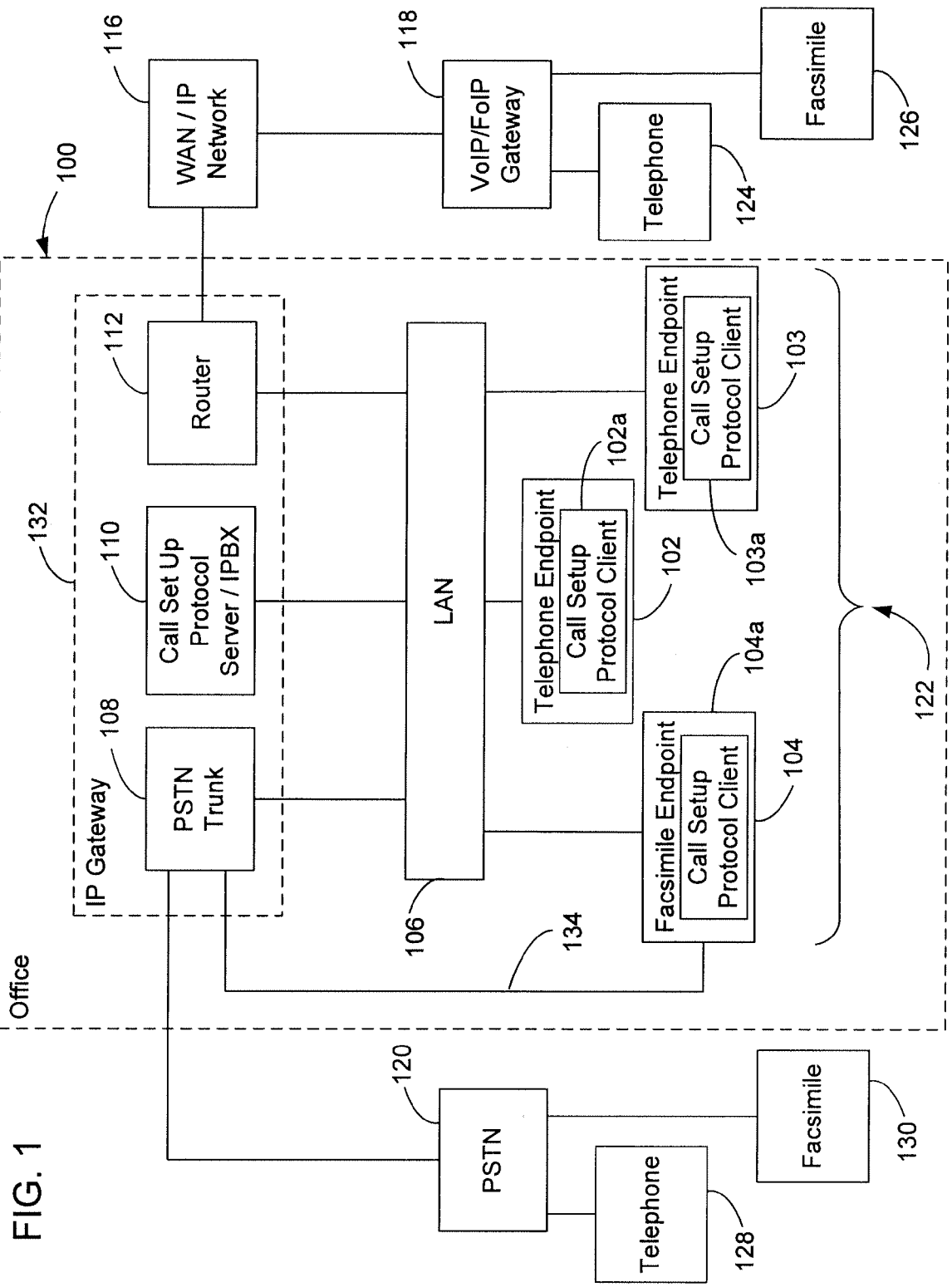
FIG. 1 is a block diagram of one embodiment of telecommunications equipment in an office according to the present disclosure.

Embodiments of a method for systems and methods for network facsimile transmissions are described herein. In the following description, numerous details are provided to give a thorough understanding of embodiments. One skilled in the relevant art will recognize, however, that the embodiments can be practiced without one or more of the specific details, or with other methods, components, materials, etc. In other instances, well-known structures, materials, or operations are not shown or described in detail to avoid obscuring aspects of this disclosure.

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. In particular, an "embodiment" may be a system, an article of manufacture (such as a computer readable storage medium), a method, and a product of a process.

The phrases "connected to," and "in communication with" refer to any form of interaction between two or more entities, including mechanical, electrical, magnetic, and electromagnetic interaction. Two components may be connected to each other even though they are not in direct contact with each other and even though there may be intermediary devices between the two components.

Much of the infrastructure that can be used with embodiments disclosed herein is already available, such as: general purpose computers; computer programming tools and techniques; computer networks and networking technologies; wireless communication; and digital storage media.

Suitable networks for configuration and/or use as described herein include one or more local area networks, wide area networks, metropolitan area networks, and/or "Internet" or IP networks such as the World Wide Web, a private Internet, a secure Internet, a value-added network, a virtual private network, an extranet, an intranet, or even standalone machines which communicate with other machines by physical transport of media. In particular, a suitable network may be formed from parts or entireties of two or more other networks, including networks using disparate hardware and network communication technologies. A network may incorporate land lines, wireless communication, and combinations thereof.

The network may include communications or networking software such as software available from Novell, Microsoft, Artisoft, and other vendors, and may operate using TCP/IP, SPX, IPX, and other protocols over twisted pair, coaxial, or optical fiber cables, telephone lines, satellites, microwave relays, modulated AC power lines, physical media transfer, and/or other data transmission "wires" known to those of skill in the art. The network may encompass smaller networks and/or be connectable to other networks through a gateway or similar mechanism.

Each computer of a network may include a processor such as a microprocessor, microcontroller, logic circuitry, or the like. The processor may include a special purpose processing device such as an ASIC, PAL, PLA, PLD, Field Programmable Gate Array, or other customized or programmable device. The computer may also include a computer readable storage medium such as non-volatile memory, static RAM, dynamic RAM, ROM, CD-ROM, disk, tape, magnetic, optical, flash memory, or other computer readable storage medium. The computer may also include various input devices and/or output devices. The input device(s) may include a keyboard, mouse, touch screen, light pen, tablet, microphone, sensor, or other hardware with accompanying firmware and/or software. The output device(s) may include a monitor or other display, printer, switch, signal line, or other hardware with accompanying firmware and/or software.

Aspects of certain embodiments described herein are illustrated as software modules or components. As used herein, a software module or component may include any type of computer instruction or computer executable code located within a computer readable storage medium. A software module may, for instance, comprise one or more physical or logical blocks of computer instructions, which may be organized as a routine, program, object, component, data structure, etc., that performs one or more tasks or implements particular abstract data types.

In certain embodiments, a particular software module may comprise disparate instructions stored in different locations of a computer readable storage medium, which together implement the described functionality of the module. Indeed, a module may comprise a single instruction or many instructions, and may be distributed over several different code segments, among different programs, and across several computer readable storage media. Some embodiments may be practiced in a distributed computing environment where tasks are performed by a remote processing device linked through a communications network. In a distributed computing environment, software modules may be located in local and/or remote computer readable storage media. In addition, data being tied or rendered together in a database record may be resident in the same computer readable storage medium, or across several computer readable storage media, and may be linked together in fields of a record in a database across a network.

The software modules tangibly embody a program, functions, and/or instructions that are executable by computer(s) to perform tasks as described herein. Suitable software, as applicable, may be readily provided by those of skill in the pertinent art(s) using the teachings presented herein and programming languages and tools, such as XML, Java, Pascal, C++, C, database languages, APIs, SDKs, assembly, firmware, microcode, and/or other languages and tools. Suitable signal formats may be embodied in analog or digital form, with or without error detection and/or correction bits, packet headers, network addresses in a specific format, and/or other supporting data readily provided by those of skill in the pertinent art(s).

In an office environment conventional phone lines are becoming scarce; however, conventional telephone lines continue to be a reliable communication vehicle for sending facsimile transmissions. The term conventional telephone line may refer to RJ11, RJ14 and RJ25 physical connectors and wiring. Many enterprises are opting to utilize voice-over-IP ("VoIP") systems, which leverage the power and lower cost of data transmission on an IP network and provide enhanced functionality.

A VoIP private branch exchange ("PBX"), also known as an IP-PBX or IPBX, may make connections among telecommunication endpoints in the system and may also selectively connect an internal telecommunication endpoint to the public switched telephone network (PSTN) via trunk lines. VoIP PBX, IP-PBX, or IPBX are all referred to herein as IPBX. An IPBX may provide similar functionality to a traditional PBX, and may also enable the use of a data network to reduce telecommunications expenses and provide increased flexibility and functionality. VoIP systems may allow for reduction in telecommunications expenses by transmitting voice traffic over the data network. An IPBX may connect to other IPBXs across a wide area network ("WAN") to transmit VoIP data without relying on the PSTN.

Sending and receiving facsimile transmissions over IP ("FoIP") may similarly allow for reduced costs and added functionality. As used herein FoIP refers to protocols, such as T.37 and T.38, designed for transmission of facsimile transmissions over data networks. While various systems and protocols have been proposed to allow for FoIP, conventional telephone lines continue to be used. The slow adoption of FoIP systems and protocols may be attributable to interoperability problems between certain FoIP systems. FoIP interoperability can be impacted by the type of equipment used, VoIP and FoIP gateway features, facsimile call switching, and deviations in facsimile call tones. Further IP network impediments—such as delays and timing issues, packet formats, redundancy, error correction mode (ECM), end-to-end transmission characteristics, clock drifts, various configurations and interactions between voice and facsimile modules—also affect interoperability. Network impediments are typically a greater concern in WANs, as opposed to local area networks ("LAN"). LANs are typically well-maintained, and in many instances can provide a reliable connection for a FoIP system. In contrast, network traffic on larger networks, including the Internet, is frequently delayed and/or data packets are lost. In spite of these problems, in certain circumstances FoIP systems transmitting data on WANs may be practicable.

In view of these and other difficulties, many enterprises continue to rely on the public switched telephone network ("PSTN") for sending and receiving facsimile transmissions. Frequently, a conventional facsimile machine is connected to a typical phone line, and is utilized for sending and receiving facsimiles. Using the PSTN for sending and receiving facsimiles generally alleviates the interoperability and network impediment issues that may be problematic for FoIP systems. In order to continue to use a conventional facsimile machine in connection with an IPBX, however, additional hardware and expense are required. Connecting an analog facsimile machine to an IPBX requires a specific connection known as a subscriber line interface circuit ("SLIC"). A SLIC provides an interface between a conventional facsimile machine and an IPBX. A SLIC may perform multiple tasks, such as analog-to-digital and digital-to-analog conversion required for the facsimile machine to send and receive facsimiles. The requirement that facsimile machines be connected to the IPBX using a SLIC increases costs and limits the placement of facsimile machines within an office. Further, the number of SLIC connections in an IPBX may be limited. In many offices utilizing VoIP systems, conventional telephone lines may not exist, and thus may need to be specifically installed. In some cases, a conventional telephone line must run from the IPBX to the location where a facsimile machine is to be used.

Disclosed herein are embodiments of systems and methods for network facsimile transmissions, in which a facsimile machine may operate in connection with an IPBX, but which may still utilize the PSTN and the T.30 protocol for sending and receiving facsimile transmissions. In certain embodiments, the facsimile machine may also include additional features which allow the facsimile machine to utilize a WAN for transmitting facsimile data utilizing FoIP protocols, such as T.38 and T.37. In other embodiments, a standard PSTN interface may also be included, allowing an enterprise to continue utilizing a conventional PSTN connection, while allowing the enterprise to upgrade to a VoIP/FoIP system in the future.

FIG. 1 is a block diagram of one possible configuration according to the present disclosure of telecommunications equipment in an office 100. A plurality of endpoints 122 may be connected to a LAN 106. Connections to the LAN may be embodied using Ethernet or other wired or wireless networking technology. The plurality of endpoints 122 may include a plurality of VoIP telephone endpoints 102, 103 and a facsimile endpoint 104. Of course, more than one facsimile endpoint may be utilized. A call set up protocol server and IPBX 110 (referred to herein collectively as a call setup protocol server) and a router 112 are also connected to the LAN 106. The router 112, call set up protocol server 110, and PSTN trunk 108 may comprise an IP gateway 132. The IP gateway 132 may comprise an interface for connecting the LAN to the PSTN 120 and a WAN or IP Network 116. The IP gateway 132 may relay traffic between the LAN 106 and the PSTN 120, and between the LAN 106 and the WAN/IP Network 116.

The call set up protocol server 110 may be responsible for permitting familiar telephone-like operations, such as dialing a number, causing a phone to ring, hearing ringback tones or a busy signal. The call set up protocol server 110 may also register endpoints, validate requests, provide address resolution, allow endpoints to exchange messages, provide routing and security policies, authenticate endpoints, provide redirect services, and the like. Examples of standard call set up protocols include Session Initiation Protocol ("SIP"), H.323, and Media Gateway Control Protocol ("MGCP"). In various embodiments, the call set up protocol server 110 may operate according to SIP, H323, and MGCP. Examples of proprietary call set up protocols include Cisco Skinny Client Control protocol and Nortel UniStim. Other call set up protocols are also contemplated within the scope of the present disclosure.

Each of the plurality of endpoints 122 includes a call set up protocol client 102a, 103a, 104a. Each call set up protocol client 102a, 103a, 104a is responsible for interfacing with the call set up protocol server 110. When an endpoint 122 is first connected, the call set up protocol client of the extension registers with the call set up protocol server 110. During the registration, each of the plurality of endpoints 122 may be assigned a telephone extension.

One of the plurality of endpoints 122 may be connected to any other of the plurality of endpoints 122 in response to dialing the assigned telephone extension. The telephone extension may also correspond to a telephone number that can be reached from outside of the office 100 through the PSTN 120. When a call is placed using one of the plurality of endpoints 122, the respective call set up protocol client forwards a request to the call set up protocol server 110. If the call is internal to the office 100, the call set up protocol sever/IPBX 110 may provide address resolution. For example, a telephone call may originate from telephone endpoint 102 and may request a connection to telephone endpoint 103. The call set up protocol server 110 may resolve the address of telephone endpoint 103, may cause telephone endpoint 103 to ring, may establish the call, and may tear down the connection at the end of the call. In another example, if a voice call from telephone endpoint 102 is to be placed to a telephone 128, which is external to the office 100, telephone endpoint 102 may be connected to the PSTN trunk 108. The PSTN trunk 108 is connected to the PSTN 120. Through the PSTN 120, telephone endpoint 102 may connect to telephone 128.

In an IPBX endpoint mode of operation, a facsimile is to be transmitted from a facsimile endpoint (e.g. facsimile endpoint 104) located in the office 100 to a remote facsimile machine 130. In this mode, part of the transmission is accomplished using the LAN 106, and part of the transmission is accomplished using the PSTN 120. The LAN 106 carries data from facsimile endpoint 104 to the PSTN trunk 108. The facsimile transmission may then be transmitted using the PSTN 120, and accordingly may realize the advantages in reliability and interoperability afforded by the PSTN 120. In such a scenario, facsimile endpoint 104 is able to communicate as if it were a conventional facsimile machine connected to the PSTN 120.

In a legacy mode of operation, facsimile endpoint 104, which is located in the office 100, relies on a conventional PSTN connection for transmitting a facsimile without sending the facsimile transmission through the LAN 106. A PSTN telephone line 134, may connect directly to the PSTN trunk 108, and may be used in the legacy mode for sending and receiving facsimile transmissions. Incorporating the legacy mode of operation may advantageously allow an enterprise to continue to use a PSTN telephone line for sending and receiving facsimile transmissions, and may facilitate upgrading to a VoIP/FoIP system in the future.

In a T.38 mode of operation, a facsimile is to be sent from facsimile endpoint 104 in the office 100 to a remote facsimile machine 126. In the T.38 mode, facsimile data from facsimile endpoint 104 may be transmitted via the LAN 106 to a router 112. The router 112 may be connected to a WAN or IP network 116. A remote VoIP/FoIP gateway 118 may in turn be connected to the desired remote facsimile machine 126. In one embodiment, the T.38 protocol may be used for transmitting a facsimile between facsimile endpoint 104 and facsimile machine 126. The T.38 protocol is a FoIP protocol for the sending and receiving of facsimiles across IP networks in a real-time mode. According to the T.38 protocol, facsimile transmissions may be sent as encoded UDP or TCP/IP data packets.

The ability to operate in each of the three above-described modes increases the possible applications for facsimile endpoints according to the present disclosure. A facsimile endpoint that may operate in each of the three above-described modes may allow for a transition from using the PSTN as the transmission system to using an IPBX system, and using VoIP/FoIP systems. Existing infrastructure may be utilized, while allowing for savings from VoIP/FoIP to be realized when possible. Further, such a system eliminates the need for SLIC connections and the expense and effort that may be required for installing a conventional telephone line.

Figure 2:
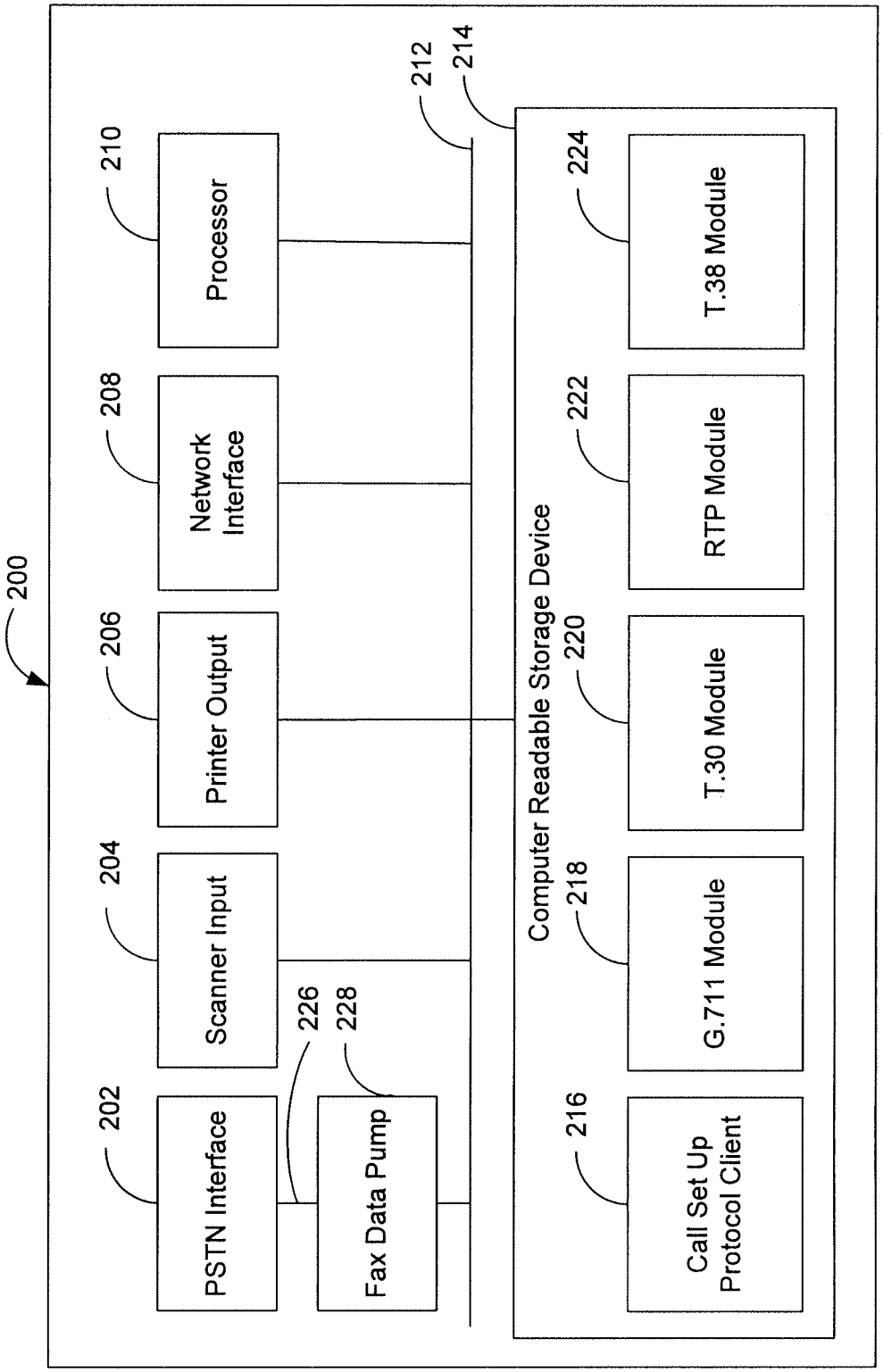
FIG. 2 is a functional block diagram of one embodiment of a facsimile machine according to the present disclosure.

FIG. 2 is a functional block diagram of one embodiment of a facsimile endpoint 200 according to the present disclosure. The facsimile endpoint 200 includes a plurality of inputs and outputs, including a PSTN interface 202, a scanner input 204, a printer output 206, and a network interface 208. The PSTN interface 202 and the network interface 208, are configured for bi-directional communication, and may be utilized to send and receive facsimile transmissions. A facsimile data pump 228 may be disposed between the PSTN Interface 202 and the data bus 212. The facsimile data pump 228 may modulate T.30 encoded data to an analog signal that may be transmitted on the PSTN. The facsimile data pump 228 may also modulate T.30 encoded data before G.711 and RTP encoding. The facsimile data pump may be connected to the data bus 212 using a serial protocol interface (SPI). Further the facsimile data pump may be connected to the PSTN interface 202 using the DIB 226. DIB 226 may include specialized circuitry for withstanding electrical shocks that may occur on the PSTN. In certain embodiments the facsimile data pump 228 may be omitted. In embodiments not including a facsimile data pump 228, modulation of T.30 encoded data into an analog signal may be accomplished by the processor 210 and appropriate software modules.

The data bus 212 may connect the DIB 226, the scanner input 204, the printer output 206, the network interface 208, the processor 210 and a computer readable storage medium 214. The data bus 212 may carry data between connected components. The facsimile endpoint 200 may include a processor 210 for controlling its operation. The processor may be embodied as a general purpose processor, an application specific processor, a microcontroller, a digital signal processor, or other device known in the art. The processor 210 performs logical and arithmetic operations based on program code stored within the computer readable storage medium 214.

The computer readable storage medium 214 may comprise various modules for sending and receiving facsimile transmissions and for establishing communications using a variety of communications protocols. In the illustrated embodiment, the computer readable storage medium 214 includes a G.711 module 218, a T.30 module 220, a real-time transport protocol ("RTP") module 222, and a T.38 module 224. The T.30 module 220 may be responsible for negotiating connections with other T.30 facsimile machines and for encoding and decoding messages sent to and received from other facsimile machines using the T.30 protocol. The T.38 module 224 may be responsible for negotiating connections with other facsimile machines and for encoding and decoding messages sent to and received from other facsimile machines using the T.38 protocol.

The RTP module 222 and the G.711 module 218 may allow the facsimile endpoint to transmit data on the LAN as VoIP traffic. The RTP module 222 may create packets in accordance with the RTP protocol that can be transmitted on a packet network. The RTP data packets may include various information, including, a packet sequence number, a time stamp, a source identifier, and payload data. The packet sequence may allow a receiver to detect packet loss and to restore packet sequence. The timestamp may allow synchronization and jitter calculations. The G.711 protocol may encode data using the A-law or μ-law specification.

The computer readable storage medium 214 may include a call set up protocol client 216, or as discussed in reference to FIG. 1, the facsimile endpoint 200 may include a call setup protocol client 216 resident on the computer readable storage medium 214. The call setup protocol client 216 may be configured to interface with a call set up protocol server. The call set up protocol client 216 may be a thin client, thus minimizing the computational requirements of the processor 210. In various embodiments, the call set up client 216 may operate according to SIP, H.323, MGCP, or other call set up protocol.

In certain embodiments, facsimile endpoint 200 may be embodied as a stand alone system, while in other embodiments, facsimile endpoint 200 may be a device composed of separate components. Stand alone systems may comprise a multifunction peripheral device. Additional functionality may be combined with the functionality of the facsimile endpoint 200 in an MFP. Such functionality may include printing, scanning, photocopying, a telephone, an answering machine, and the like. In certain embodiments, a display system may be used in place of, or in addition to a printer. The printer output 206 may automatically print incoming facsimile transmissions, confirmation of facsimile transmissions that have been sent, and/or notices indicating that a facsimile transmission was not successful.

FIG. 3 is a flow chart illustrating one embodiment of a method 300 for sending a facsimile transmission in a legacy mode, an IPBX endpoint mode, and a T.38 mode. Common to each method of sending a facsimile transmission are the steps registering 301 the facsimile endpoint with the call set up protocol server, receiving 302 acknowledgement of endpoint registration from the server, and scanning 303 the document. Acknowledgement of endpoint registration in step 302 may include assignment of an extension to the facsimile endpoint. Once an extension has been assigned, the extension may be dialed by other endpoints connected to the call set up protocol server. In certain embodiments, the extension may also correspond to a telephone number that may be reached via the PSTN. A mode of facsimile transmission is determined 304. As discussed above, where a FoIP connection is available and is sufficiently reliable, the FoIP connection may be used so as to avoid charges assessed for use of the PSTN. Where a FoIP connection is not available, but a conventional telephone line is available, a legacy mode may be used. Finally, where a facsimile endpoint is connected to an IPBX system, an IPBX endpoint mode may be used.

In the legacy facsimile mode, a document scanned at step 301 is encoded 305 according to the T.30 protocol. In certain embodiments, a facsimile data pump may modulate the T.30 encoded data to an analog signal that may be transmitted on the PSTN. The T.30 encoded signal is transmitted 306 to the PSTN trunk. The scanned document is transmitted 308 via the PSTN to its intended recipient. The transmission in step 308 may be according to the T.30 protocol. As illustrated in FIG. 1 and discussed above, the legacy mode utilizes a standard telephone line to connect to the PSTN. Accordingly, steps 301 and 302 may not be necessary for sending a facsimile transmission in the legacy mode.

In an IPBX endpoint mode, a connection to the PSTN trunk is set up 309 via the call set up protocol server. Step 309 may include a request from an endpoint including a call set up protocol client to connect to the PSTN trunk. The call set up protocol server may respond to the client's request by providing an address of the PSTN trunk. The endpoint may then connect to the address of the PSTN trunk. The document scanned at step 301 is encoded 310 according to the T.30, G.711, and RTP protocols. In certain embodiments, the same facsimile data pump that is utilized in the legacy mode may modulate the T.30 encoded data before the G.711 and RTP encoding. The encoded signal is routed 312 to the LAN. The encoding performed at step 310 generates data packets comprising the facsimile transmission that may be selectively routed 314 to the PSTN trunk by the LAN. The scanned document may be transmitted 316 via the PSTN using the T.30 protocol to its intended recipient.

In a T.38 mode, a connection to a router is set up 317 via the call set up protocol server. Step 317 may include a request from a facsimile endpoint including a call set up protocol client to connect a remote facsimile via the router. The call set up protocol server may respond to the client's request by providing an address of the router. The facsimile endpoint may then connect to the router address. The document scanned at step 301 is encoded 318 according to the T.38 protocol. The encoded signal is routed 320 to the LAN. The encoding performed at step 318 generates data packets that may be transmitted 322 to the router by the LAN. The scanned document may be transmitted via the WAN using the T.38 protocol to its intended recipient.

FIG. 4 is a flow chart illustrating one embodiment of a method 400 for receiving a facsimile transmission in a legacy mode, an IPBX endpoint mode, and a T.38 mode. Common to each method of receiving a facsimile transmission are the steps registering 401 the facsimile endpoint with the call set up protocol server, and receiving 402 acknowledgement of endpoint registration from the server. As discussed above, the facsimile endpoint may be assigned a particular telephone extension that can be reached by other endpoints or that can be reached through the PSTN. An incoming facsimile may be directed to the endpoint by dialing the telephone extension. The incoming facsimile is received 403. The method 400 determines which mode is appropriate for receiving the facsimile. If the incoming facsimile transmission is received using a PSTN telephone line, the legacy mode is utilized. As illustrated in FIG. 1 and discussed above, the legacy mode utilizes a standard telephone line to connect to the PSTN. Accordingly, the steps 401 and 402 may not be necessary for receiving a facsimile transmission in the legacy mode. Rather, the method 400 may simply respond to an incoming facsimile transmission in the same manner as a conventional facsimile machine. The incoming facsimile is received 406 from the PSTN. The incoming facsimile is decoded in accordance with the T.30 protocol. The incoming facsimile is printed or stored 410.

In an IPBX facsimile endpoint mode, a facsimile may be received from the PSTN and routed to an IPBX facsimile endpoint. A connection is set up 412 from the PSTN trunk to the IPBX facsimile endpoint via the call set up protocol server. The call set up protocol server may initiate communication by sending an appropriate signal to the facsimile endpoint client. The incoming facsimile data packets received from the PSTN may be routed 414 via the LAN to the IPBX facsimile endpoint. The received data packets may be decoded 416 according to the T.30, G.711, and RTP protocols. The incoming facsimile transmission may be printed or stored 418.

In a T.38 mode, a facsimile may be received from the WAN and routed to an IPBX facsimile endpoint. The call set up protocol server may set up 420 a connection between the router and the IPBX facsimile endpoint. The incoming facsimile data packets from the WAN are routed 422 to the IPBX facsimile endpoint via the LAN. The incoming facsimile data packets are decoded 424 according to the T.38 protocol. The incoming facsimile transmission may be printed or stored 426.

It will be obvious to those having skill in the art that many changes may be made to the details of the above-described embodiments without departing from the underlying principles of the disclosure. The scope of the disclosure and embodiments discussed herein should, therefore, be determined only by the following claims.

The invention claimed is:

1. A facsimile endpoint comprising:
a network interface integral with the facsimile endpoint, the network interface configured to connect to a local area data network (LAN);
a processor; and
a non-transitory computer readable storage medium in communication with the processor and the network interface and integral with the facsimile endpoint, the non-transitory computer readable storage medium comprising:
   a call set up protocol client executable on the processor, the call setup protocol client configured to:
      select a mode of facsimile transmission, wherein possible modes include an internet private branch exchange (IPBX) endpoint mode and a T.38 mode, and wherein selecting the IPBX endpoint mode includes determining whether the facsimile endpoint is connected to an IPBX;
      communicate with a call set up protocol server over the LAN to register the facsimile endpoint with the IPBX, wherein the call set up protocol server comprises the IPBX; and
      communicate with the call set up protocol server over the LAN using the network interface to establish a communication channel configured to transmit data packets between the facsimile endpoint and a public switched telephone network (PSTN) using the LAN if the IPBX endpoint mode is selected; and
   a T.30 module executable on the processor, the T.30 module configured to encode and decode facsimile data according to ITU-T Recommendation T.30;
wherein T.30 encoded facsimile data is selectively routed to and received from the PSTN if the IPBX endpoint mode is selected, and
wherein the T.30 encoded facsimile data is transmitted over the LAN by the network interface if the IPBX endpoint mode is selected.

2. The facsimile endpoint of claim 1, wherein the non-transitory computer readable storage medium further comprises:
a G.711 module executable on the processor, the G.711 module configured to further encode the T.30 encoded facsimile data according to ITU-T Recommendation G.711, and
wherein G.711 encoded facsimile data may be selectively routed over the LAN by the network interface.

3. The facsimile endpoint of claim 2, wherein the non-transitory computer readable storage medium further comprises:
a real-time transport protocol module executable on the processor, the real-time transport protocol module configured to further encode the G.711 encoded facsimile data according to a real-time transport protocol (RTP), and
wherein RTP encoded facsimile data may be selectively routed over the LAN by the network interface.

4. The facsimile endpoint of claim 1, wherein the non-transitory computer readable storage medium further comprises:
a T.38 module executable on the processor, the T.38 module configured to encode and decode data according to ITU-T Recommendation T.38, and
wherein data encoded by the T.38 module is selectively routed to the network interface if the T.38 mode is selected.

5. The facsimile endpoint of claim 1, further comprising:
a facsimile data pump configured to modulate the T.30 encoded facsimile data to output an analog signal,
wherein the analog signal output by the facsimile data pump may be selectively routed over the LAN by the network interface to the PSTN.

6. The facsimile endpoint of claim 1, further comprising:
a scanner input in communication with the processor and the computer readable storage medium.

7. The facsimile endpoint of claim 1, further comprising:
a printer output in communication with the processor and the computer readable storage medium.

8. The facsimile endpoint of claim 1, wherein the call set up protocol client is configured to operate in compliance with a session initiation protocol.

9. A system for sending a facsimile transmission, the system comprising:
a local area network (LAN);
a call set up protocol server in communication with the LAN, wherein the call set up protocol server comprises an internet private branch exchange (IPBX);
a trunk in communication with the LAN and a public switched telephone network (PSTN); and
at least one facsimile endpoint in communication with the LAN, the facsimile endpoint configured to:
   communicate with the call set up protocol server over the LAN to register the facsimile endpoint with the IPBX; and
   communicate with the call set up protocol server over the LAN to establish a communication channel between the facsimile endpoint and the trunk,
wherein the facsimile endpoint is configured to send the facsimile transmission by selectively routing data comprising the facsimile transmission to the public switched telephone network via the LAN using the communication channel, and
wherein the data comprising the facsimile transmission is encoded according to ITU-T Recommendation T.30.

10. The system of claim 9, wherein the data comprising the facsimile transmission is encoded according to ITU-T Recommendation G.711.

11. The system of claim 10, wherein the data comprising the facsimile transmission is encoded according to a real-time transport protocol.

12. The system of claim 9, further comprising:
a router in communication with the LAN and a wide area network (WAN),
wherein the facsimile endpoint is configured to communicate with the call set up protocol server using the LAN to establish a communication channel between the facsimile endpoint and the WAN, and
wherein the facsimile endpoint is configured to send the facsimile transmission by routing data comprising the facsimile transmission to the WAN via the LAN using the communication channel.

13. The system of claim 12, wherein the data comprising the facsimile transmission is encoded according to ITU-T Recommendation T.38.

14. The system of claim 9, wherein the facsimile endpoint further comprises a PSTN interface, the PSTN interface communicating the facsimile endpoint to the PSTN; and wherein the facsimile endpoint is configured to send the facsimile transmission by selectively routing data comprising the facsimile transmission to the PSTN via the PSTN interface.

15. The system of claim 9, wherein the facsimile endpoint further comprises a scanner input.

16. The system of claim 9, wherein the facsimile endpoint further comprises a printer output.

17. The system of claim 9, wherein the call set up protocol server is configured to operate according to a session initiation protocol.

18. A method for transmitting a facsimile, the method comprising:
communicating a facsimile endpoint with a local area network (LAN);
communicating a call set up protocol server to the LAN;
communicating a public switched telephone network (PSTN) trunk to the LAN;
communicating the facsimile endpoint with the call set up protocol server over the LAN to register the facsimile endpoint with an internet private branch exchange (IPBX), wherein the call set up protocol server comprises the IPBX;
setting up a connection between the facsimile endpoint and the PSTN trunk using the LAN;
encoding the facsimile according to ITU-T Recommendation T.30; and
transmitting the facsimile via the LAN to the PSTN trunk utilizing the connection.

19. The method of claim 18, further comprising:
encoding the facsimile according to ITU-T Recommendation G.711.

20. The method of claim 19, further comprising:
encoding the facsimile according to a real-time transport protocol.

21. The method of claim 18, further comprising:
connecting a router to the LAN and a wide area network (WAN);
setting up a connection between the facsimile endpoint and the WAN using the LAN;
encoding the facsimile according to ITU-T Recommendation T.38; and
transmitting the facsimile via the WAN to the WAN utilizing the connection.

22. The method of claim 18, further comprising:
connecting a PSTN interface to a PSTN; and
transmitting the facsimile by routing data comprising the facsimile transmission to the PSTN via the PSTN interface.

23. The method of claim 18, further comprising:
scanning the facsimile using a scanner input.

24. The method of claim 18, wherein the call set up protocol server operates according to a session initiation protocol.

\* \* \* \* \*